July 12, 1949.　　　　　J. H. RUNBAKEN　　　　　2,476,115
ELECTRICAL TESTING INSTRUMENT
Filed Nov. 5, 1945
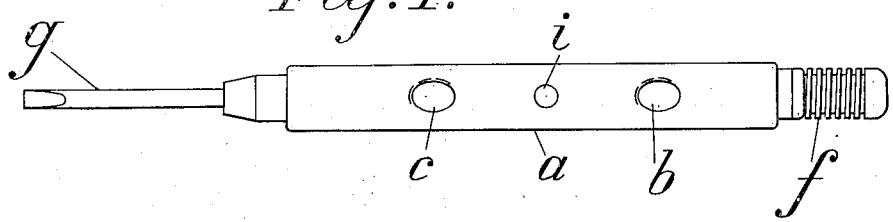
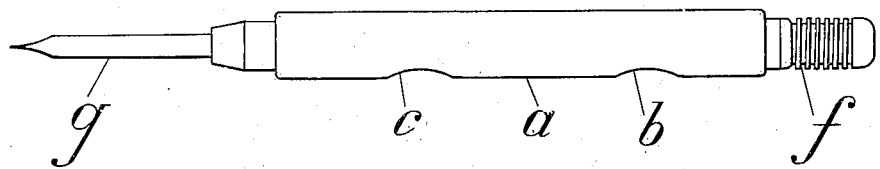
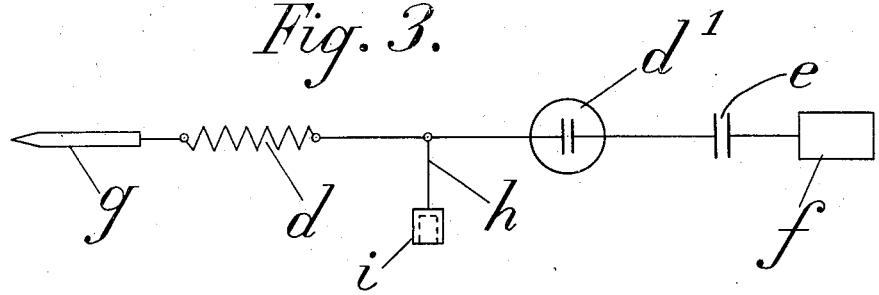
Inventor
J. H. Runbaken Patented July 12, 1949

2,476,115

UNITED STATES PATENT OFFICE 2,476,115

ELECTRICAL TESTING INSTRUMENT

Julian Henry Runbaken, Hill Top, Wilmslow, England

Application November 5, 1945, Serial No. 626,783
In Great Britain January 10, 1945

1 Claim. (Cl. 175—183)

The object of the present invention is to provide an improved instrument for testing for the flow of high voltage and also low voltage electric currents.

The invention consists in an electrical testing instrument comprising a body with two apertures therein, at one of which a neon lamp can be viewed and at the other of which an electric resistance can be observed, there being a metallic handle or grip in electrical connection through a condenser with one electrode of the neon lamp at one end of the body, a metal conductor in electrical connection with one end of the electric resistance at the other end of the body, and a connection between the resistance and neon tube with a tapping extending to the surface of said body to which an external circuit can be connected.

Referring to the accompanying sheet of explanatory drawings:

Figures 1 and 2 are two views of an instrument constructed in one convenient form in accordance with this invention, the instrument in one view being turned through 90° relatively to the instrument as shown in the other view.

Figure 3 is a diagram showing the electrical interconnection of the parts of the instrument.

The body or tube $a$ of the instrument may be made of ebonite, synthetic resin or other nonconducting material. It has two openings therein at $b$ and $c$. Within the tube behind the opening $b$ is a neon lamp $d^1$ (see Figure 3) and behind the opening $c$ is an electrical resistance $d$ in a transparent sleeve. The neon lamp is connected through a condenser $e$ with a metal handle or grip $f$ which the user holds when making a test for high voltage currents. The end $g$ of the instrument may be in the form of a screw driver bit or other useful metal tool.

The electrical interconnection of the parts is indicated in the diagram, Figure 3. It will be seen that there is a tapping $h$ with a socket $i$ thereon between the resistance $d$ and the neon lamp $d^1$.

To make a test for high voltage current, the bit $g$ is brought into contact with the part where the flow of high voltage current is suspected, and the operator grips the handle $f$. The neon lamp $d^1$ will glow if high voltage current is flowing in said part.

To test for low voltage current, a circuit is completed through $g$ and $i$. If the resistance $d$ becomes luminous, then the circuit is live.

There may be a suitable cap to place over the bit $g$ and a clip on the body $a$ so that the instrument can be conveniently carried in the pocket.

What I claim is:

An electrical testing instrument comprising a tubular body of insulating material having two apertures therein, a metallic grip at one end of the body, a metal bit at the other end of the body, an electrical glow resistance, a neon lamp and a condenser located within the body, conductors connecting said resistance, lamp and condenser in series circuit between said bit and said grip in the order recited, the resistance and the neon lamp being located so as to be visible through the apertures in the body, and a conducting socket extending to the surface of the body between said apertures, electrically connected to one of said conductors between the resistance and the neon lamp, and adapted to be connected to an external circuit.

JULIAN HENRY RUNBAKEN.

REFERENCES CITED

The following references are of record in the file of this patent:

UNITED STATES PATENTS

| Number | Name | Date |
|---|---|---|
| 988,192 | Hetherington | Mar. 28, 1911 |
| 1,528,709 | Trimble | Mar. 3, 1925 |
| 2,116,448 | O'Brien et al. | May 3, 1938 |

FOREIGN PATENTS

| Number | Country | Date |
|---|---|---|
| 359,593 | Great Britain | Oct. 29, 1931 |